US012387738B2

(12) United States Patent
Cutler

(10) Patent No.: US 12,387,738 B2
(45) Date of Patent: Aug. 12, 2025

(54) DISTRIBUTED TELECONFERENCING USING PERSONALIZED ENHANCEMENT MODELS

(71) Applicant: Microsoft Technology Licensing, LLC, Redmond, WA (US)

(72) Inventor: Ross Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 17/848,678

(22) Filed: Jun. 24, 2022

(65) Prior Publication Data

US 2023/0421702 A1    Dec. 28, 2023

(51) Int. Cl.
G10L 21/02      (2013.01)
H04M 3/56      (2006.01)

(52) U.S. Cl.
CPC ............. *G10L 21/02* (2013.01); *H04M 3/569* (2013.01)

(58) Field of Classification Search
None
See application file for complete search history.

(56) References Cited

U.S. PATENT DOCUMENTS

| 8,126,129 | B1 * | 2/2012 | McGuire | H04M 3/568 |
| | | | | 379/202.01 |
| 9,741,360 | B1 * | 8/2017 | Li | G10L 25/51 |
| 2004/0116130 | A1 * | 6/2004 | Seligmann | H04M 3/564 |
| | | | | 455/456.1 |
| 2022/0084509 | A1 | 3/2022 | Sivaraman et al. | |
| 2022/0199102 | A1 * | 6/2022 | Ostrand | H04L 65/1083 |
| 2022/0303502 | A1 * | 9/2022 | Fisher | G10L 15/26 |
| 2022/0377117 | A1 * | 11/2022 | Xi | H04L 12/1818 |

FOREIGN PATENT DOCUMENTS

| EP | 1381237 | A2 | 1/2004 |
| WO | 2021119090 | A1 | 6/2021 |
| WO | 2022253003 | A1 | 12/2022 |
| WO | 2023064750 | A1 | 4/2023 |

OTHER PUBLICATIONS

Borriello, et al., "Walrus: Wireless Acoustic Location with Room-level Resolution using Ultrasound", In Proceedings of the 3rd International Conference on Mobile Systems, Applications, and Services, Jun. 6, 2005, pp. 191-203.

(Continued)

*Primary Examiner* — Antim G Shah
(74) *Attorney, Agent, or Firm* — Schwegman Lundberg & Woessner, P.A.

(57) ABSTRACT

This document relates to distributed teleconferencing. Some implementations can employ personalized enhancement models to enhance microphone signals for participants in a call. Further implementations can perform proximity-based mixing, where microphone signals received from devices in a particular room can be omitted from playback signals transmitted to other devices in the same room. These techniques can allow enhanced call quality for teleconferencing sessions where co-located users can employ their own devices to participate in a call with other users.

12 Claims, 12 Drawing Sheets

(56) References Cited

OTHER PUBLICATIONS

Hu, et al., "DCCRN: Deep Complex Convolution Recurrent Network for Phase-Aware Speech Enhancement", In Repository of arXiv:2008.00264v1, Aug. 1, 2020, 5 Pages.
Vaswani, et al., "Attention Is All You Need", In Proceedings of Advances in Neural Information Processing Systems, Dec. 4, 2017, 11 Pages.
Williamson, et al., "Complex Ratio Masking for Monaural Speech Separation", In Journal of IEEE/ACM Transactions on Audio, Speech, and Language Processing, vol. 24, Issue 3, Mar. 2016, pp. 483-492.
"Invitation To Pay Additional Fees Issued in PCT Application No. PCT/US23/023351", Mailed Date: Jul. 13, 2023, 11 Pages.
Cutler, et al., "ICASSP 2022 Acoustic Echo Cancellation Challenge", In Repository of arXiv:2202.13290v1, Feb. 27, 2022, 5 Pages.
Eskimez, et al., "Personalized Speech Enhancement: New Models And Comprehensive Evaluation", In Repository of arXiv:2110.09625v1, Oct. 18, 2021, 5 Pages.
Ruiz, et al., "Distributed Combined Acoustic Echo Cancellation And Noise Reduction Using GEVD-Based Distributed Adaptive Node Specific Signal Estimation With Prior Knowledge", In Proceedings of 28th European Signal Processing Conference, Jan. 18, 2021, pp. 206-210.
"International Search Report and Written Opinion Issued in PCT Application No. PCT/US23/023351", Mailed Date: Sep. 5, 2023, 18 Pages.

\* cited by examiner

DISTRIBUTED TELECONFERENCING USING PERSONALIZED ENHANCEMENT MODELS

BACKGROUND

One important use case for computing devices involves teleconferencing, where participants communicate with remote users via audio and/or video over a network. Often, audio signals for a given teleconference are enhanced to remove artifacts such as device distortion, echoes, and/or noise. Conventionally, audio enhancement is performed by a centralized model, but there are various drawbacks to this approach that are described in more detail below.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for distributed teleconferencing. One example includes a method or technique that can be performed on a computing device. The method or technique can include receiving an enhanced first microphone signal, the enhanced first microphone signal having been produced by enhancing a first microphone signal captured by a first device using a first personalized enhancement model that has been adapted for a first user of the first device. The method or technique can also include receiving an enhanced second microphone signal, the enhanced second microphone signal having been produced by enhancing a second microphone signal captured by a second device using a second personalized enhancement model that has been adapted for a second user of the second device. The method or technique can also include mixing the enhanced first microphone signal with the enhanced second microphone signal to obtain a playback signal and sending the playback signal to a third device that is participating in a call with the first device and the second device.

Another example includes a method or technique that can be performed on a computing device. The method or technique can include receiving a first microphone signal from a first device and receiving a second microphone signal from a second device that is co-located with the first device. The method or technique can also include mixing the first microphone signal with the second microphone signal to obtain a playback signal. The method or technique can also include sending the playback signal to a third device that is participating in a call with the first device and the second device. The method or technique can also include sending another playback signal to at least one of the first device or the second device, the another playback signal omitting the first microphone signal and the second microphone signal.

Another example includes a system having a hardware processing unit and a storage resource storing computer-readable instructions. When executed by the hardware processing unit, the computer-readable instructions can cause the system to receive an enhanced first microphone signal from a first device, the enhanced first microphone signal having been enhanced by a first personalized enhancement model that has been adapted for a first user of the first device. The computer-readable instructions can also cause the system to receive an enhanced second microphone signal from a second device that is co-located with the first device, the enhanced second microphone signal having been enhanced by a second personalized enhancement model that has been adapted for a second user of the second device. The computer-readable instructions can also cause the system to mix the enhanced first microphone signal with the enhanced second microphone signal to obtain a playback signal and send the playback signal to a third device that is participating in a call with the first device and the second device.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
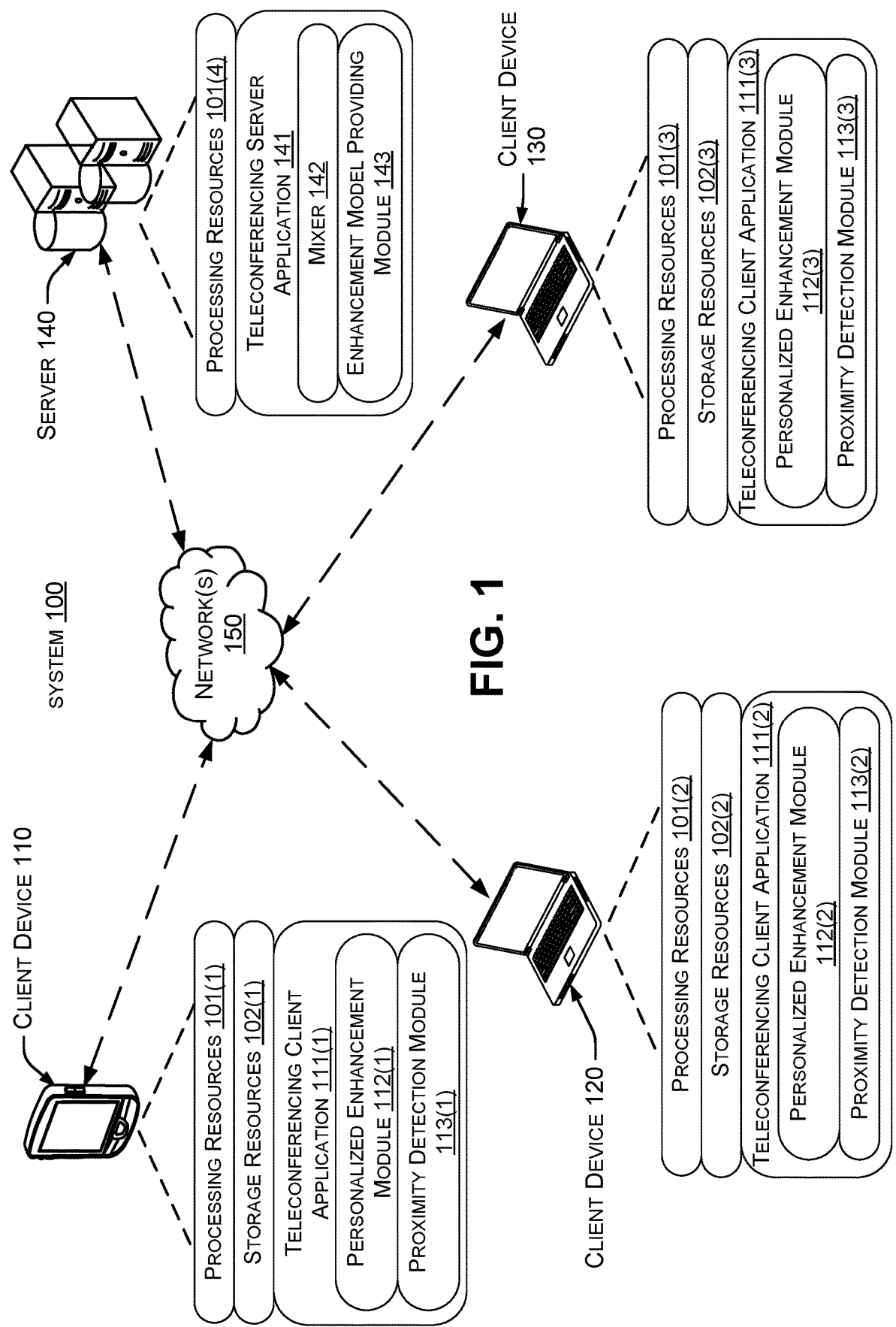
FIG. 1 illustrates an example system, consistent with some implementations of the present concepts.

The disclosed implementations generally offer techniques for enabling high-quality audio for teleconferences, including scenarios where co-located users employ personal devices to participate in a teleconference. As noted previously, conventional teleconferencing solutions often employ a centralized enhancement model that removes unwanted artifacts such as echoes and/or noise from audio signals during a call. However, effective employment of such centralized enhancement models often involves very precise synchronization of microphones and/or speakers involved in the call. This can be very difficult due to issues such as network latency and jitter.

One way to reduce the synchronization difficulties for an enhancement model is to employ an approach where co-located users share a single device. For instance, some offices have dedicated conference rooms with a single teleconferencing device having a microphone and loudspeaker that are shared by all users in the room. This approach reduces the complexity of synchronizing devices on the call relative to having each user employ their own personal device, since fewer microphones and loudspeakers need to be synchronized to accommodate the multiple users in the room.

However, dedicated teleconferencing rooms have their own drawbacks. For instance, users may wish to conduct ad-hoc meetings from arbitrary locations instead of having to schedule a dedicated teleconferencing room to conduct an online meeting. Users may also wish to employ their own personal devices to participate in the call, instead of having all users in a given room share the same device.

One potential approach for allowing ad-hoc teleconferencing in a shared space involves employing local enhancement models on each device in the room. This approach has a lower network burden than centralized approaches and does not necessarily involve the use of dedicated teleconferencing rooms or devices. However, this approach also tends to perform poorly without tight synchronization between each device in a given shared space. For instance, consider that audio is generally sampled at rates of 16 khz or higher. At 16 khz sampling rates, each device must be synchronized to within a single sample's accuracy (0.0000625 seconds) to prevent audio leakage across samples. This is generally not practical for wireless connections due to each device having different processing delays that affect network latency. While devices can be hardwired together to enable precise synchronization, this is generally inconvenient for users.

The disclosed implementations can overcome these deficiencies of prior techniques by employing distributed audio enhancement using personalized enhancement models. Microphone signals picked up by each user device in a given room can be processed using personalized enhancement models that can remove components of audio signals produced by sound sources other than the user's voice. In other words, each personalized enhancement model is adapted to isolate the user's voice by attenuating other components of the microphone signal and communicate the enhanced microphone signal to other devices taking part in the call. Because the enhanced microphone signal has little or no detectable audio components from sound sources other than the voice of the device's user, satisfactory audio quality can be obtained without necessarily synchronizing co-located devices to within single-sample accuracy.

Another issue that can arise in distributed teleconferencing scenarios is that users in a given room can hear local speakers' voices multiple times—once from the speaker's own speech, and one or more subsequent times when that speech is replayed by the teleconferencing application on each local device in the room. This can cause a "howling loop" that renders the teleconference sound quality unusable. To overcome this problem, the disclosed implementations can detect when two or more participant devices in a given call are co-located and perform proximity-based mixing of microphone signals. The proximity-based mixing can adjust how microphone signals are mixed so that co-located devices (e.g., in the same room) do not play back speech by other co-located users. Thus, each user in the room simply hears the actual voice of the current speaker without subsequent playback via the teleconferencing application.

Definitions

For the purposes of this document, the term "signal" refers to a function that varies over time or space. A signal can be represented digitally using data samples, such as audio samples, video samples, or one or more pixels of an image. An "enhancement model" refers to a model that processes data samples from an input signal to enhance the perceived quality of the signal. For instance, an enhancement model could remove noise or echoes from audio data, or could sharpen image or video data. The term "personalized enhancement model" refers to an enhancement model that has been adapted to enhance data samples specifically for a given user. For instance, as discussed more below, a personalized data enhancement model could be adapted to filter out noise, echoes, etc., to isolate particular user's voice by attenuating components of an audio signal produced by other sound sources.

The term "mixing," as used herein, refers to combining two or more signals to produce another signal. Mixing can include adding two audio signals together, interleaving individual audio signals in different time slices, synchronizing audio signals to video signals, etc. In some cases, audio signals from two co-located devices can be mixed to obtain a playback signal. The term "co-located," as used herein, means that two devices have been determined to be within proximity to one another according to some criteria, e.g., the devices are within the same room, within a threshold distance of one another, etc. The term "playback signal," as used herein, refers to a signal that is played back by a loudspeaker. A playback signal can be a combination of one or more microphone signals. An "enhanced" signal is a signal that has been processed using an enhancement model to improve some signal characteristic of the signal.

The term "signal characteristic" describes how a signal can be perceived by a user, e.g., the overall quality of the signal or a specific aspect of the signal such as how noisy an audio signal is, how blurry an image signal is, etc. The term "quality estimation model" refers to a model that evaluates an input signal to estimate how a human might rate the perceived quality of the input signal for one or more signal characteristics. For example, a first quality estimation model could estimate the speech quality of an audio signal and a second quality estimation model could estimate the overall quality and/or background noise of the same audio signal. Audio quality estimation models can be used to estimate signal characteristics of an unprocessed or raw audio signal or a processed audio signal that has been output by a particular data enhancement model. The output of a quality estimation model can be a synthetic label representing the signal quality of a particular signal characteristic. Here, the term "synthetic label" means a label generated by a machine evaluation of a signal, where a "manual" label is provided by human evaluation of a signal.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, data enhancement models can be configured to enhance or otherwise manipulate signals to produce processed signals. Data enhancement models can include codecs or other compression mechanisms, audio noise suppressors, echo removers, distortion removers, image/video healers, low light enhancers, image/video sharpeners, image/video denoisers, etc., as discussed more below.

The term "impairment," as used herein, refers to any characteristic of a signal that reduces the perceived quality of that signal. Thus, for instance, an impairment can include noise or echoes that occur when recording an audio signal, or blur or low-light conditions for images or video. One type of impairment is an artifact, which can be introduced by a data enhancement model when removing impairments from a given signal. Viewed from one perspective, an artifact can be an impairment that is introduced by processing an input signal to remove other impairments. Another type of impairment is a recording device impairment introduced into a raw input signal by a recording device such a microphone or camera. Another type of impairment is a capture condition impairment introduced by conditions under which a raw input signal is captured, e.g., room reverberation for audio, low light conditions for image/video, etc.

The following discussion also mentions audio devices such as microphones and speakers. Note that a microphone that provides a microphone signal to a computing device can be an integrated component of that device (e.g., included in a device housing) or can be an external microphone in wired or wireless communication with that computing device. Similarly, when a computing device plays back a signal over a loudspeaker, that loudspeaker can be an integrated component of the computing device or in wired or wireless communication with the computing device. In the case of a wired or wireless headset, a microphone and one or more loudspeakers can be integrated into a single peripheral device that sends microphone signals to a corresponding computing device and outputs a playback signal received from the computing device.

Machine Learning Overview

There are various types of machine learning frameworks that can be trained to perform a given task, such as estimating the quality of a signal or enhancing a signal. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

Example System

The present implementations can be performed in various scenarios on various devices. FIG. 1 shows an example system 100 in which the present implementations can be employed, as discussed more below.

As shown in FIG. 1, system 100 includes a client device 110, a client device 120, a client device 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the servers, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on client device 120, (3) indicates an occurrence of a given component on client device 130, and (4) indicates an occurrence of a given component on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client devices 110, 120, and/or 130 can include respective instances of a teleconferencing client application 111. The teleconferencing client application can provide functionality for allowing users of the client devices to conduct audio teleconferencing with one another, with and/or without video functionality. Each instance of the teleconferencing client application can include a corresponding personalized enhancement module 112 configured to perform personalized microphone signal enhancement for a user of that client device. Thus, personalized enhancement model 112(1) can enhance microphone signals in a manner that is personalized to a first user of client device 110 when the first user is conducting a call using teleconferencing client application 111(1). Likewise, personalized enhancement model 112(2) can enhance microphone signals in a manner that is personalized to a second user of client device 120 when the second user is conducting a call using teleconferencing client application 111(2). Similarly, personalized enhancement model 112(3) can enhance microphone signals in a manner that is personalized to a third user of client device 130 when the third user is conducting a call using teleconferencing client application 111(3).

Each instance of the teleconferencing client application 111 can also include a proximity detection module 113. The proximity detection module can be configured to detect when other client devices are in proximity. As discussed more below, the proximity detection module can employ various techniques to detect whether other devices are in proximity. In some cases, the proximity detection module can be configured to estimate whether other devices are in the same room. Thus, for instance, proximity detection module 113(1) on client device 110 can detect when client device 120 arrives in the same room as client device 110, e.g., based on a sound or radio frequency signal emitted by proximity detection module 113(2) on client device 120. Likewise, proximity detection module 113(1) can also detect when client device 120 leaves the room.

Teleconferencing server application 141 on server 140 can coordinate calls among the individual client devices by communicating with the respective instances of the teleconferencing client application 111 over network 150. For instance, teleconferencing server application 141 can have a mixer 142 that selectively mixes individual microphone signals from the respective client devices to obtain one or more playback signals and communicates the playback signals to the client devices during a call. For video conferencing scenarios, the mixer can also mix video signals together with the audio signals and communicate the mixed video/audio signals to participants in a call.

In some cases, the mixer 142 can perform proximity-based mixing. For instance, if client device 110 and 120 are not in proximity to one another, the mixer can send playback signals to these devices that include microphone signals from the other device. In other words, client device 110 receives a playback signal that includes a microphone signal from client device 120, and vice-versa. Once the server determines that client device 110 and 120 are co-located, the mixer can adjust the audio mix by omitting the microphone signals from these two devices from the playback signals sent thereto. This is feasible because users in the same room should be able to hear each other speak without playback by the teleconferencing client application 111. Said another way, the playback signal delivered to a particular client device can be adjusted by the mixer to omit microphone signals from other client devices that are in proximity to that particular client device, as described more below.

The teleconferencing server application can also have an enhancement model providing module 143 that provides an enhancement model to each respective client device. As described more below, the enhancement model can be pre-trained using training data from various users to remove sound sources other than the user that speaks into that device. Each client device can modify the enhancement model provided by server 140 to obtain a respective personalized enhancement model.

In some cases, the personalized enhancement module 112 on each client device can personalize a pretrained enhancement model received from server 140 by receiving a speech example from a user. The speech example can be processed to obtain a corresponding embedding that represents acoustic characteristics of speech by that user. The pretrained enhancement model can be adapted for each user by providing the embedding representing that user as an input to the model. Thus, for instance, the same pretrained model can be adapted for a first user of client device 110 by providing the pretrained model with a first embedding representing acoustic characteristics of speech by the first user, adapted for a second user of client device 120 by providing the pretrained model with a second embedding representing acoustic characteristics of speech by the second user, and adapted for a third user of client device 130 by providing the pretrained model with a third embedding representing acoustic characteristics of speech by the third user. Once adapted for a given user, the respective personalized enhancement modules 112 can suppress other sounds picked up by microphones of the devices to help isolate the user's voice.

Voice Call Examples

Figure 2:
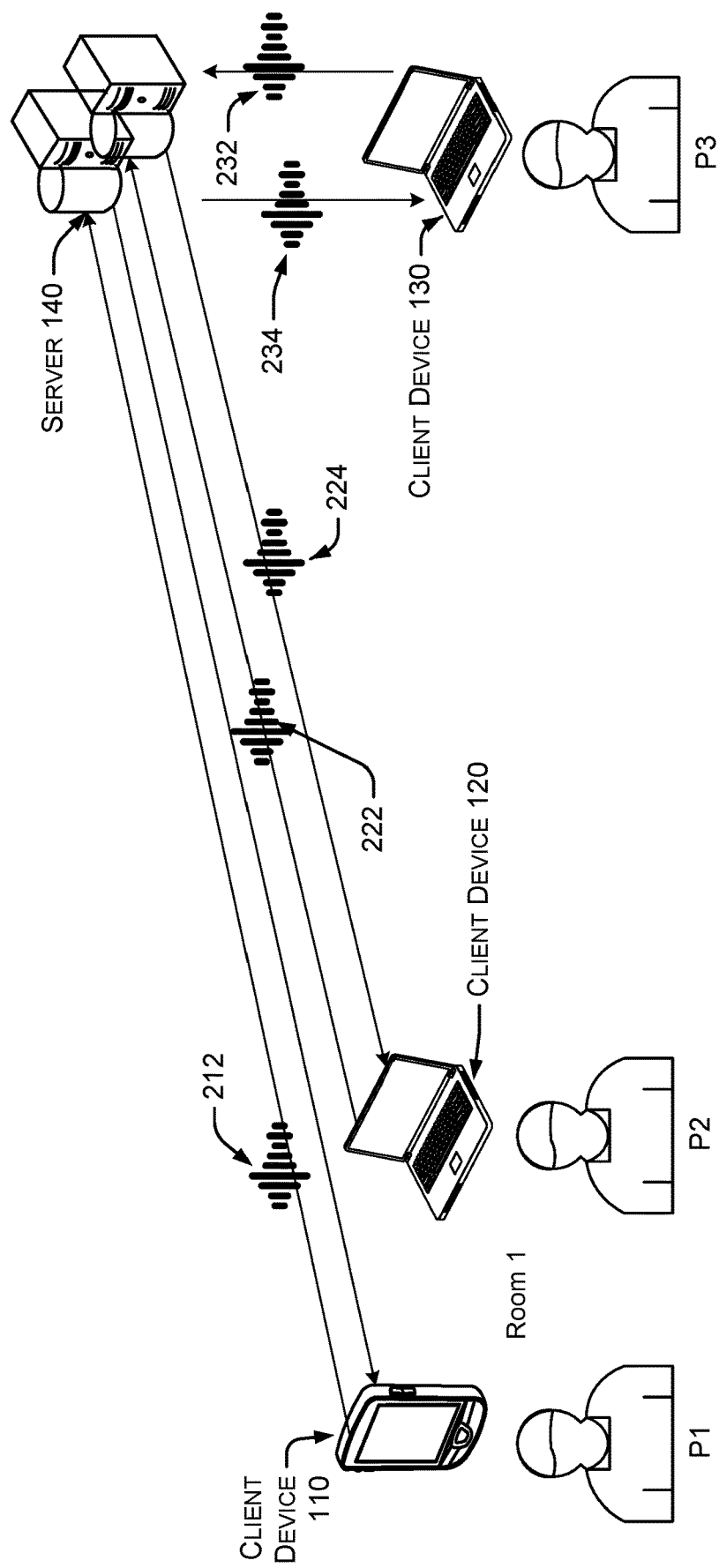
FIG. 2 illustrates an example teleconferencing scenario without personalized audio enhancement or proximity-based mixing, consistent with some implementations of the present concepts.

FIG. 2 illustrates a scenario where the respective client devices do not perform personalized enhancement and the server 140 does not perform proximity-based mixing. A first user P1 speaks into client device 110, and the microphone of client device 110 picks up microphone signal 212. Microphone signal 212 is sent to the server 140. In addition, client device 120 picks up the speech by first user P1 and communicates a microphone signal 222 to the server. Client device 130 also picks up a microphone signal 232 and communicates this to the server 140. The server mixes the received microphone signals together and communicates them back to the individual devices as playback signal 224 for playback on client device 120 and playback signal 234 for playback on client device 130. Note that the server generally does not play back sound from the device that picks up that sound, and thus no playback signal is illustrated as being sent from the server to client device 110.

Note that the microphone on client device 120 picks up various sounds, including speech by the user P1 in the same room as client device 120, playback signal 224 played back by a loudspeaker of client device 120, as well as any ambient noise in the room. While client device 130 is not in proximity to any of client device 110, client device 120, or speaker P1, the microphone of client device 130 can still pick up the playback signal 234 played back over the loudspeaker of client device 130, as well as any ambient noise or other artifacts present at the location of user P3. Generally speaking, the introduction of crosstalk picked up by client device 120 when user P1 speaks and the introduction of echoes by user P1's speech being played back on client device 120 creates undesirable artifacts that can degrade call quality.

Figure 3:
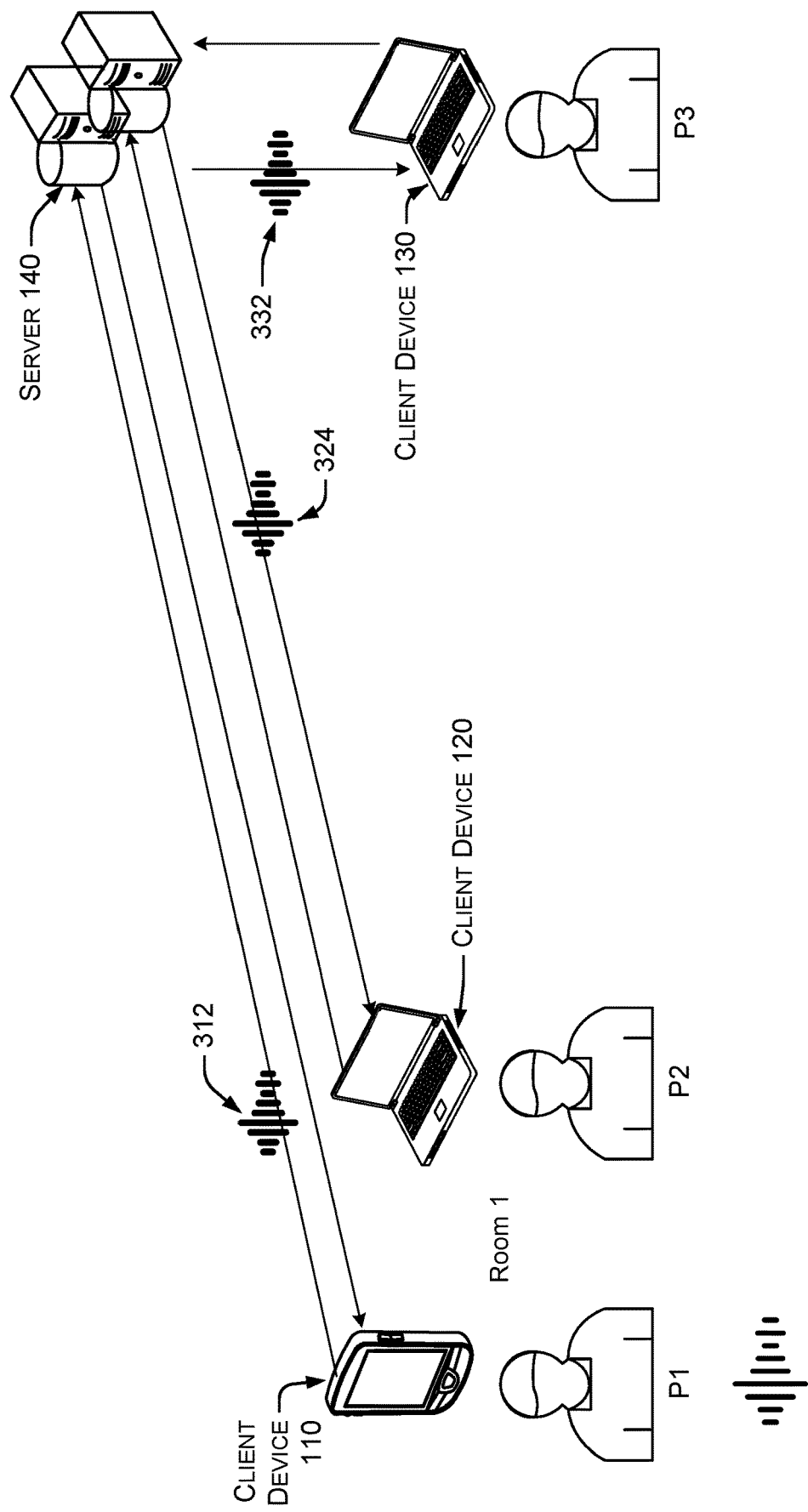
FIG. 3 illustrates an example teleconferencing scenario with personalized audio enhancement and without proximity-based mixing, consistent with some implementations of the present concepts.

FIG. 3 illustrates a scenario where each client device uses a corresponding personalized enhancement model to perform user-specific enhancement of the microphone signal picked up by that device. As noted, this involves suppressing sounds other than those produced by that device's user, such as noise, echoes, or speech by other users. The effect is illustrated in FIG. 3. Here, microphone signals provided by client devices 120 and 130, respectively, are not illustrated.

This conveys that, assuming only user P1 is speaking and not users P2 or P3, the respective personalized enhancement models on client devices 120 and 130 can suppress sounds that are not produced by speech of their respective users, including speech by user P1. For instance, a 45 dB suppression of other sounds can be sufficient to effectively present microphone signals from client devices 120 and 130 from introducing detectable artifacts that degrade call quality.

While personalized speech enhancement can remove crosstalk within a given room as shown above, the playback signal provided by the server to client device 120 in room 1 can create an echo when played back shortly after speech by user P1. In other words, P1's actual voice is heard first by users P1 and P2, picked up by client device 110 as microphone signal 312, and then played back on client device 120 as playback signal 324. This playback signal can feed back into microphone signal 312, resulting in an echo because the playback signals include the voice of user P1, which is not suppressed by client device 110.

Figure 4A:
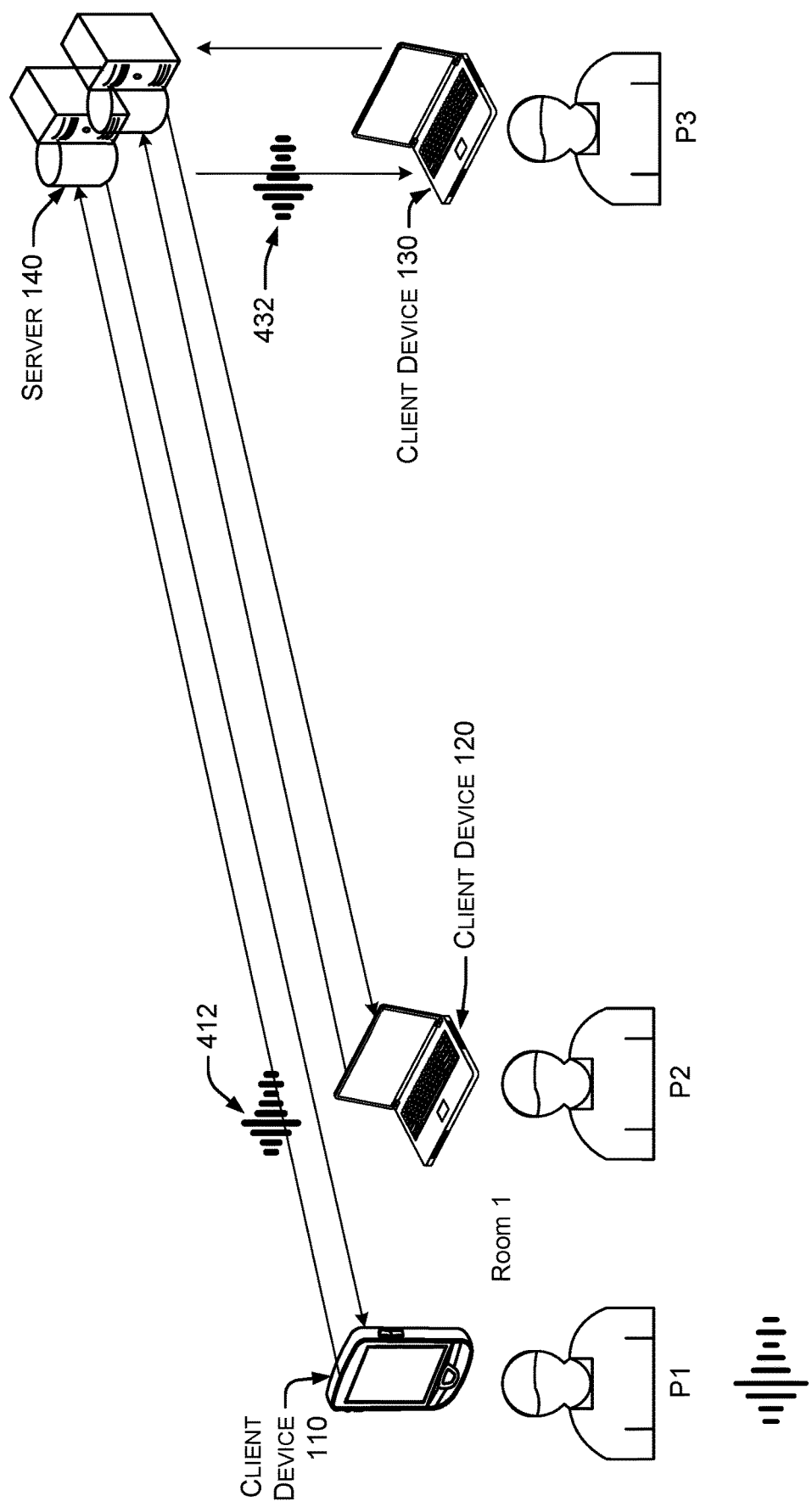
FIG. 4A illustrates an example single-speaker teleconferencing scenario with personalized audio enhancement and proximity-based mixing, consistent with some implementations of the present concepts.

FIG. 4A illustrates a single-speaker scenario where, in addition to personalized enhancement by the client devices, the server automatically detects which devices are in the room with the speaker and performs proximity-based mixing to remove undesirable artifacts. For instance, responsive to detecting that devices 110 and 120 are co-located, server 140 can omit microphone signals picked up by client devices 110 and 120 from playback by these devices. Thus, user P2 in Room 1 can simply hear the actual speech by user P1 without subsequent replay by the application, while remote user P3 hears speech by user P1 played back by client device 130.

Figure 4B:
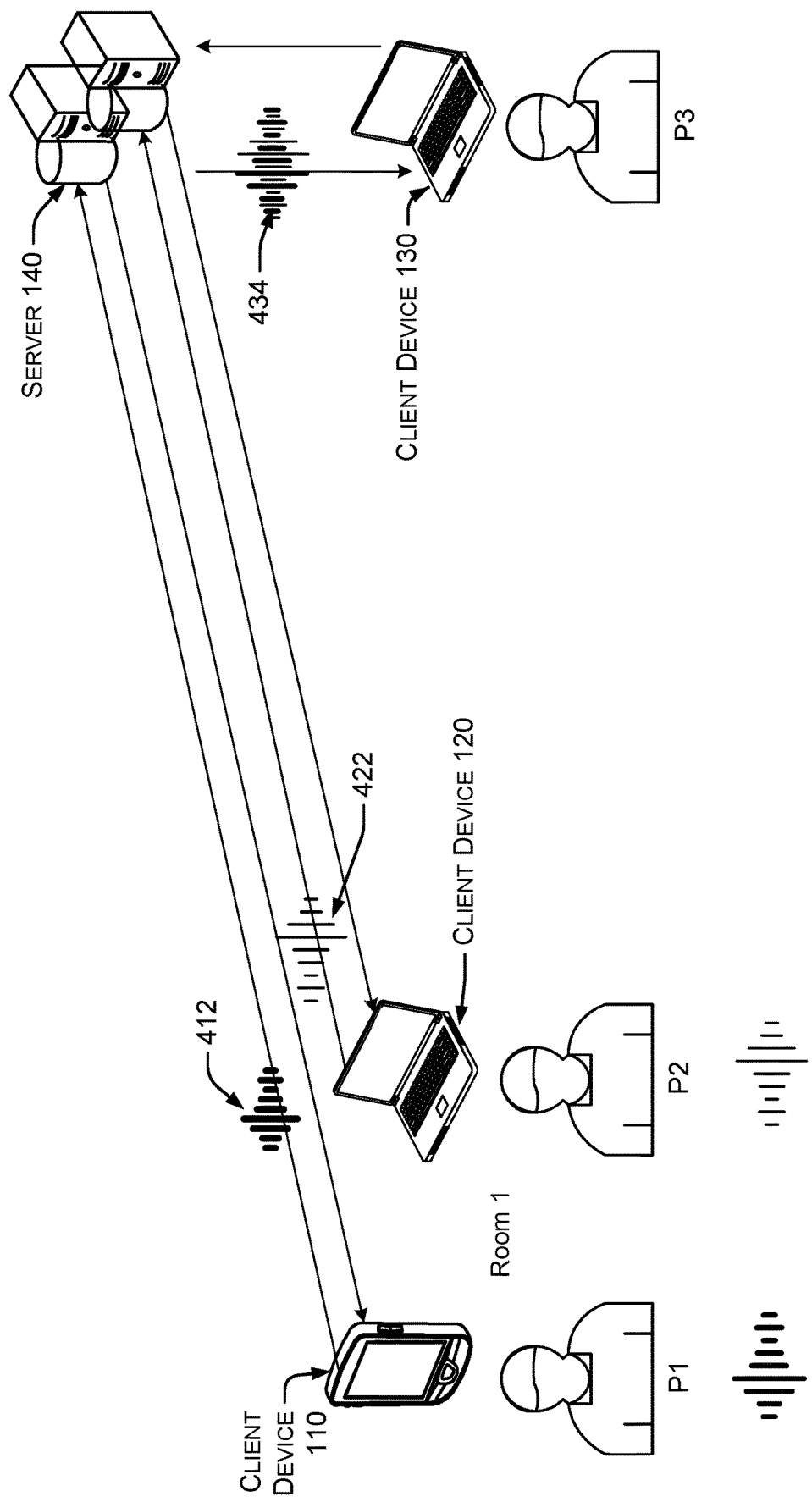
FIG. 4B illustrates an example multi-speaker teleconferencing scenario with personalized audio enhancement and proximity-based mixing, consistent with some implementations of the present concepts.

FIG. 4B extends the single-speaker scenario shown in FIG. 4A to include speech by user P2. Here, speech by user P2 is picked up by a microphone of client device 120 as microphone signal 422, which is transmitted to server 140. The server mixes microphone signals 412 and 422 to obtain a playback signal 434, which is sent to client device 130. Thus, user P3 can hear the speech by both users P1 and P2. Note that the server does not send playback signals to client device 110 or 120 with speech by either P1 or P2 because devices 110 and 120 are in proximity to one another. Furthermore, because client devices 110 and 120 employ personalized enhancement for their respective users P1 and P2, crosstalk can be mitigated so that user P3 does not hear user P2's voice as picked up by client device 110, nor user P1's voice as picked up by client device 120.

Teleconference Architecture

Figure 5:
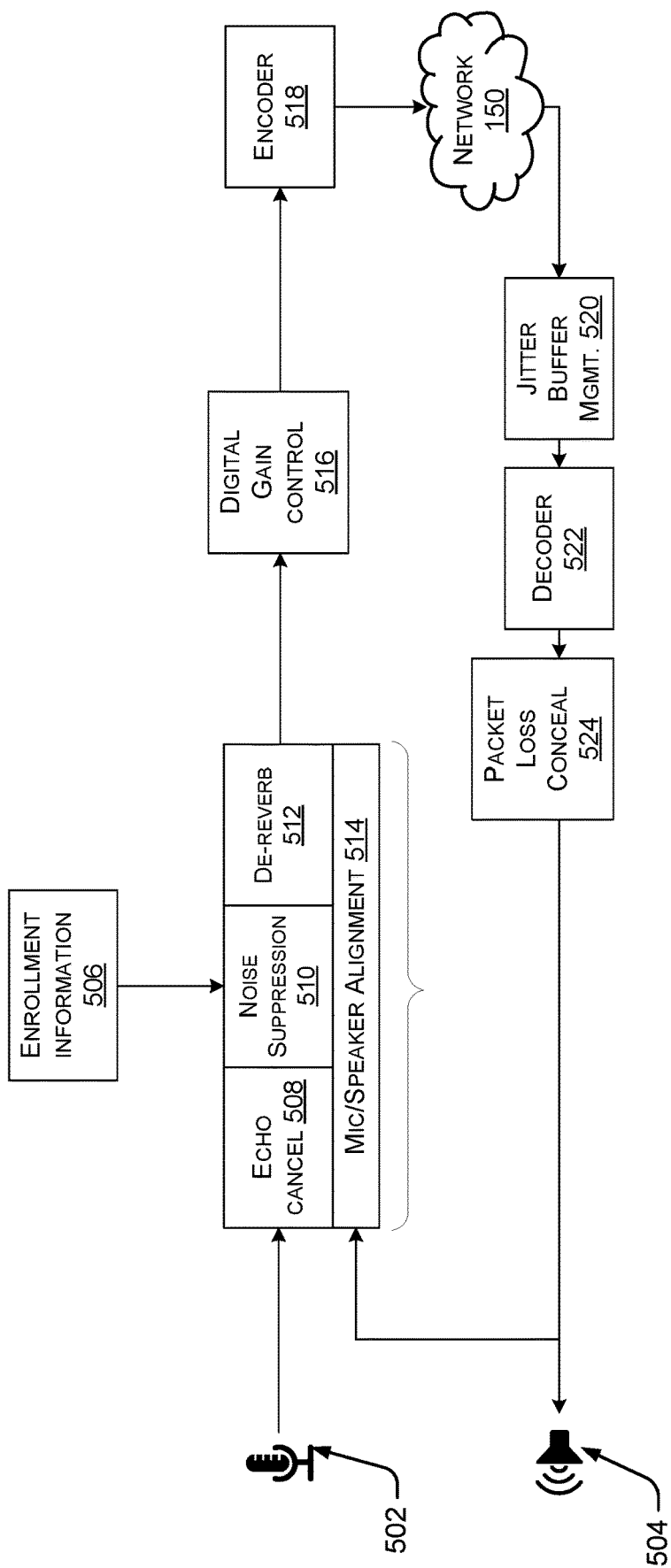
FIG. 5 illustrates an example teleconferencing architecture, consistent with some implementations of the present concepts.

FIG. 5 illustrates a teleconferencing architecture 500 in which the disclosed implementations can be provided. The following describes functionality of individual components of the teleconferencing architecture. Individual components can be implemented locally on end-user devices, such as client devices 110, 120, and 130, or on cloud-based resources such as server 140. Peer-to-peer models are also contemplated.

A signal from a microphone 502 on a client device can be processed using the teleconferencing architecture for playback on a speaker 504 of another client device. Enrollment information 506 can be obtained from a user via speech clips of words spoken by the user during an enrollment session. The speech clips can be used to derive a vector embedding representing acoustic characteristics of the user's speech. The embedding can be employed by personalized enhancement models such as echo cancellation model 508, noise suppression model 510, and/or de-reverberation model 512 to suppress sounds other than those made by the user's voice speaking into microphone 502. Microphone and speaker alignment 514 can be performed to synchronize microphone 502 with speaker 504. In some cases, speaker 504 can also be synchronized with other speakers of other co-located devices (e.g., using Network Time Protocol) for playing received playback signals.

Digital gain control 516 can be employed to automatically adjust the gain of the microphone signal. Then, an encoder 518 can encode the resulting sound signal for transmission over network 150, where the sound can be mixed by server 140 with signals from other devices. Jitter buffer management 520 can manage network jitter of a packet stream carrying the encoded audio by automatically delaying arriving packets to reduce audio quality impairments as a result of network jitter. Decoder 522 can decode the packets. Lost packets can be mitigated using packet loss concealment 524 prior to playback over speaker 504.

Specific Personalized Enhancement Models

One way to obtain a personalized enhancement model is to modify an existing model, such as the unconditional deep complex convolution recurrent network model ("DCCRN") described at Hu et al., "DCCRN: Deep Complex Convolution Recurrent Network for Phase-Aware Speech Enhancement," arXiv preprint arXiv: 2008.00264, 2020. Such a model can be converted to a personalized model that accepts a speaker d-vector as additional input. The d-vector extracted from an enrollment audio piece, or a speaker embedding, can represent the acoustic characteristics of a target speaker.

Conversion of the unconditional DCCRN model can involve the introduction of the d-vector as an input to the original architecture. One way to achieve this involves concatenating the d-vectors to the input of a complex long short-term memory ("LSTM") layer of the deep complex convolution recurrent network. Specifically, the d-vectors can be concatenated to the real and imaginary parts of the tensors coming from the complex LSTM. This modification increases the input size of the complex LSTM layer only and thus any additional computational cost is minimal.

Figure 6:
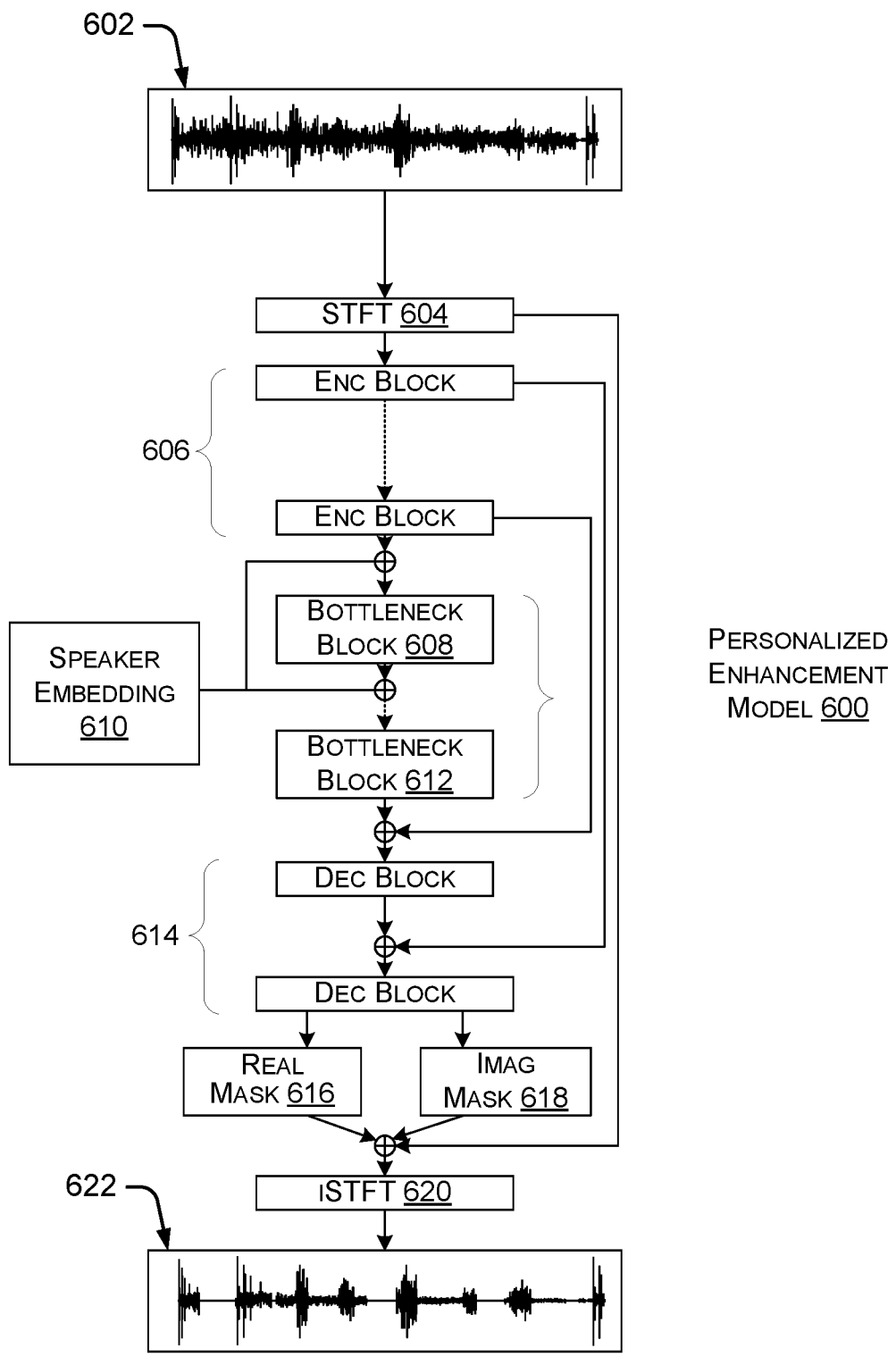
FIG. 6 illustrates an example of a personalized enhancement model, consistent with some implementations of the present concepts.
Figure 7:
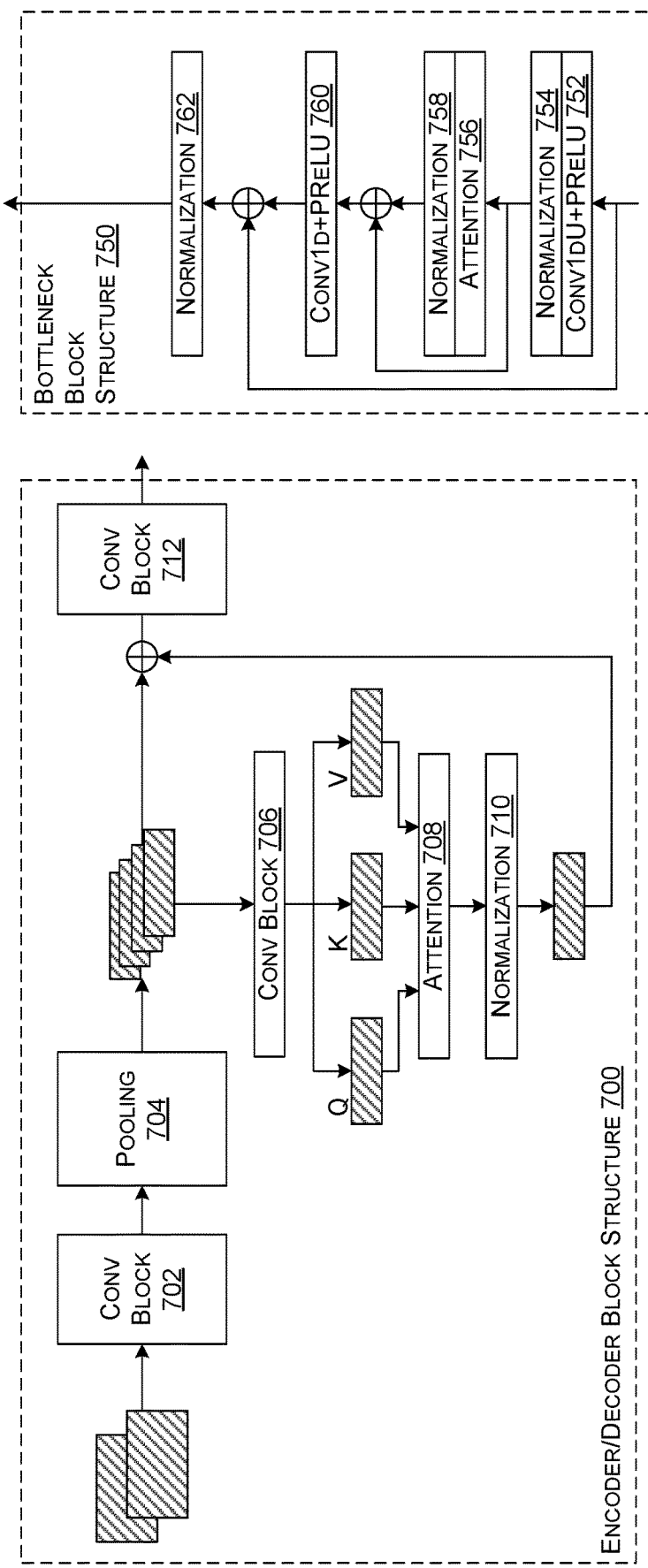
FIG. 7 illustrates structures of certain components of a personalized enhancement model, consistent with some implementations of the disclosed techniques.

Another approach to obtaining a personalized enhancement model is shown in FIGS. 6 and 7, which illustrate a model architecture based on self-attention as described at Gomez, et al., "Attention is all you need," in *Advances in neural information processing systems,* 2017, pp. 5998-6008. Additional information relating to the model shown in FIGS. 6 and 7 is available at Eskimez, et al., "Personalized Speech Enhancement: New Models And Comprehensive Evaluation", in repository of *arXiv:*2110.09625v1, Oct. 18, 2021, 5 Pages.

FIG. 6 shows an example personalized enhancement model 600. A time-domain input signal 602 is processed using a short-time Fourier transform 604 to obtain a frequency-domain representation that is processed using one or more encoder blocks 606, a bottleneck block 608, a speaker embedding 610, a bottleneck block 612, and one or more decoder blocks 614 to produce real masks 616 and imaginary masks 618. The masks can be applied to the resulting signal to attenuate frequency components from sound sources other than the speaker's voice. Then, the signal can be converted using an inverse short-time Fourier transform 620 to produce an enhanced time-domain signal 622. By conditioning individual components of the model on the received speaker embedding, the model can be adapted to perform personalized enhancement of microphone signals for that user.

1-D batch normalization can be applied to real and imaginary parts of the spectrogram after the short-term Fourier transform 604. The personalized enhancement model 600 takes the concatenation of the real and imaginary parts of the short-term Fourier transform as input features, in channel dimension, resulting in a 4-D tensor including batch dimension. After predicting the real and imaginary parts of the mask (616 and 618, respectively), the estimated complex ratio mask can be applied to the original real and imaginary parts of the noisy spectrogram, as described at Williamson, et al., "Complex Ratio Masking for Monaural Speech Separation," *IEEE/ACM transactions on audio, speech, and language processing*, vol. 24, no. 3, pp. 483-492, 2015.

Personalized enhancement model 600 provides an encoder and decoder architecture with convolution layers supported by multi-head attention. The encoder/decoder blocks can be structured according to encoder/decoder block structure 700 shown in FIG. 7. Input to a given encoder or decoder block is provided to a convolution block 702, which can process the input with a 2-D kernel followed by a parametric rectified linear unit (PReLU) and batch normalization (BN). These layers can be followed by pooling 704, which can perform max-pooling for encoder blocks and a nearest-neighbor upsampling layer for decoder blocks. The downsampling/upsampling operations can be applied to the frequency dimension.

Another convolution block 706 can process these intermediate results and output three channels. These intermediate embeddings are used as the query, key, and value for multihead attention with a causal attention mask. In FIG. 7, "Q", "K", "V" and "BN" stands for query, key, value, and batch normalization, respectively. Next, attention 708 can perform multi-head attention on the signal, which can be normalized by a normalization layer 710 and concatenated to the intermediate embeddings coming from the first convolution block 702. A third convolution block 712 takes the concatenated embeddings as input and sends its output to the next layer.

Bottleneck blocks 608 and 612 of personalized enhancement model 600 employ convolution layers with 1-D kernels and multi-head attention modules. FIG. 7 illustrates a bottleneck block structure 750 that can be employed. Input to a given bottleneck block can be processed by a convolution layer followed by PReLU layer 752 and layer normalization 754. Then, the intermediate results are fed to a multi-head attention module 756, followed by layer normalization 758. There can be a skip connection (summation) between the input and output of the block formed by multi-head attention 756 and normalization 758. The skip connection is followed by another convolution layer+PReLU layer 760, which is followed by a second skip connection: the input of the bottleneck block is summed with the output of the second convolution block. Finally, another layer normalization layer 762 is applied, and the results are sent to the next layer.

One way to train the model shown in FIGS. 6 and 7 involves a power-law compressed phase-aware (PLCPA) loss function for both automatic speech recognition accuracy and perceptual quality that can be defined as follows:

$$\mathcal{L}_a(t, f) = \left| |S(t, f)|^p - |\hat{S}(t, f)|^p \right|^2$$

$$\mathcal{L}_p(t, f) = \left\| S_{(t,f)|\rho_e i\varphi}(S(t, f))_-|\hat{S}(t, f)|^{p e i\varphi(\hat{S}(t,f))} \right\|^2$$

$$\mathcal{L}_{PLCPA} = \frac{1}{T}\frac{1}{F}\sum_t^T\sum_f^F (\alpha\mathcal{L}_a(t, f) + (1-\alpha)\mathcal{L}_p(t, f))$$

where S and $\hat{S}$ are the estimated and reference (i.e., clean) spectrograms, respectively. t and f stand for time and frequency index, while T and F stand for the total time and frequency frames, respectively. Hyper-parameter p is a spectral compression factor and can be set to 0.3. Operator φ calculates the argument of a complex number. α is the weighting coefficient between the amplitude and phase-aware components.

To alleviate any over-suppression (OS) issue, an asymmetric loss approach can be applied to the amplitude part of the loss function shown above. The asymmetric loss penalizes the T-F bins where the target speaker's voice is removed. The power-law compressed phase-aware asymmetric (PLCPA-ASYM) loss function can be defined as follows:

$$h(x) = \begin{cases} 0, & \text{if } x \leq 0 \\ x, & \text{if } x > 0 \end{cases}$$

$$\mathcal{L}_{os}(t, f) = \left| h(|S(t, f)|^p - |\hat{S}(t, f)|^p) \right|^2$$

$$\mathcal{L}_{PLCPA-ASYM} = \mathcal{L}_{PLCPA} + \beta\frac{1}{T}\frac{1}{F}\sum_t^T\sum_f^F \mathcal{L}_{os}(t, f)$$

where β is the positive weighting coefficient for $\mathcal{L}_{os}$.

Alternative Enhancement Model Personalizations

As discussed above, one way to obtain a personalized enhancement model involves learning a vector embedding that represents acoustic characteristics of a particular user's speech. That embedding can be provided to a given enhancement model with a microphone signal as an additional input. Thus, different personalized instances of the enhancement model can have the same structure and internal parameters (e.g., weights and bias values), differing only by the user-specific embeddings. When the enhancement model receives an embedding for a particular user, this effectively adapts the enhancement model to suppress sound from sound sources other than that user without necessarily performing further changes to the enhancement model. For instance, by using different speaker embeddings, the same underlying enhancement model given the same microphone signal could produce frequency masks with different values for each speaker. These masks can be used to selectively attenuate individual frequency components of the microphone signal to isolate the speaker's voice from other sound sources. Because the internal parameters of the enhancement model can remain the same for different users, the enhancement model can be pretrained and multiple copies can be distributed from server 140 to each of the client devices, without necessarily tuning or retraining the model for each user.

Another way to personalize an enhancement model involves modifying internal parameters of a generic enhancement model that has been pretrained using training data for multiple users. The internal parameters of the pretrained enhancement model can be tuned specifically for a given user to achieve a personalized enhancement model. In some cases, an entire generic enhancement model is pretrained and then the entire pretrained enhancement model is tuned for specific users. In still further cases, user-specific layers can be added to an existing pretrained generic enhancement model, where the user-specific layers are tuned to specific users while other layers of the enhancement model are trained using data for multiple users.

With respect to training, one way to obtain training data for an enhancement model is to obtain clean speech clips from multiple different users. The clean speech clips can be modified to include artifacts such as noise, reverberation, or other voices of other speakers. Models can be trained to reproduce the clean speech clips from the modified clips that have introduced artifacts.

Proximity Discovery Mechanisms

As noted previously, the mixer 142 on server 140 can perform proximity-sensitive mixing by adjusting how received microphone signals are mixed into a playback signal when two or more devices participating in a given call are co-located. Various approaches for identifying co-located devices are contemplated. For instance, in some cases, users can be provided with the ability to manually identify other users that are in the same room prior to conducting a given call, e.g., by a graphical user interface. As another example, in some cases, the server can access a calendar to determine the expected location of a given user at a given time, and can infer that two devices are co-located when the calendars of both users have appointments at the same location.

In other cases, location information can be employed to automatically infer that two or more devices are co-located. For instance, in some cases, each client device can report its location to the server 140, as determined using local device sensors, such as Global Positioning System sensors, accelerometers, gyroscopes, or Wi-Fi based positioning. The server can then designate any devices within a specified distance threshold as co-located for the purposes of conducting a call. As yet another example, Wi-Fi or Bluetooth discovery mechanisms can be employed to estimate the distance between any two devices.

Generally speaking, any of the aforementioned techniques can be sufficient to determine the respective distance between two client devices. However, in some cases, two client devices may be relatively close to one another but not in the same room. Consider two users in adjacent office rooms separated by a wall that significantly attenuates sound travel between the two rooms. In this case, the users may not be able to hear one another's voice through the walls, and would prefer to have the mixer 142 send them their neighbor's microphone signal for playback.

Thus, in some cases, sound can be employed to determine whether two client devices should be treated as co-located for mixing purposes. For instance, client device 110 can play an audio clip at an ultrasound frequency at a designated volume, and client device 120 can listen for that sound. Based on the volume of sound received by client device 120, an inference can be made as to whether the two devices are sufficiently close to consider the devices as being co-located. Additional details on using ultrasound to discover nearby devices can be found in U.S. Pat. No. 9,742,780 and Borriello et al., "Walrus: Wireless Acoustic Location with Room-level Resolution using Ultrasound," in *Proceedings of the* 3*rd International Conference on Mobile Systems, Applications, and Services* Jun. 6, 2005 (pp. 191-203).

Further Implementation Details

Another technique that can be employed to enhance audio quality involves speaker synchronization. Referring back to FIG. 2, when client devices 110 and 120 arrive in the same room, they may play back audio received from user P3 at different times. For instance, each device may receive incoming packets at different times, and/or may have different hardware or software characteristics that impact playback timing. Thus, some implementations can involve speaker synchronization for speakers on each device, e.g., using a shared network clock or other mechanism to align playback. In some cases, speaker synchronization can be implemented using Network Time Protocol to synchronize speakers within 1 millisecond of each other. This can mitigate undesirable in-room reverberation that could otherwise be caused by unsynchronized playback.

As another point, a vector embedding representing speech characteristics of a given user can be considered a form of personally identifiable information that should be protected. For instance, a malicious actor could employ such an embedding to access a user's bank account by emulating their speech signature. Thus, in some implementations, various actions can be taken to protect the embedding. One implementation involves performing enrollment processing and enhancement entirely on the client device. In this case, the client device does not send the embedding or representation thereof over network 150. The client device can also protect the embedding by mechanisms such as local encryption.

In other cases, enrollment processing can be performed in the cloud, e.g., on server 140. In this case, each client device can enroll a respective user by sending a speech signal for that user to the server. The server can perform enrollment processing by determining the speech embedding for the user and maintaining the speech embedding in a secure memory area and/or in an encrypted state. If enhancement processing is to be performed locally, the server can send the encrypted speech embedding back to the client device for use with a local enhancement model. If enhancement processing is also to be performed on the server, the server can execute the enhancement model in a protected memory region so that intermediate features communicated among layers of the model are not visible to other processes on the server.

Example Personalized Enhancement Method

Figure 8:
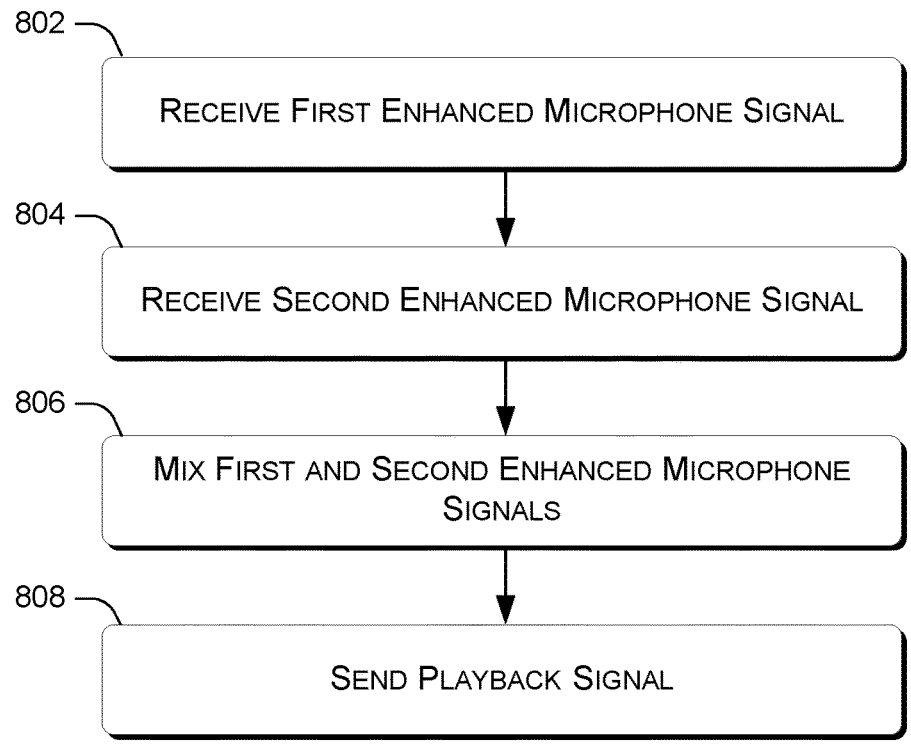
FIG. 8 illustrates an example method or technique for enhancing audio during a teleconference, consistent with some implementations of the disclosed techniques.

FIG. 8 illustrates an example method 800, consistent with some implementations of the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where an enhanced first microphone signal is received. The enhanced first microphone signal can result from enhancing a first microphone signal captured by a first device (e.g., client device 110) using a first personalized enhancement model that has been adapted for a first user of the first device (e.g., a personalized neural network as described above). In some cases, block 802 can involve enhancing the first microphone signal on a device (e.g., server 140) performing method 800, and in other cases block 802 can involve receiving the enhanced first microphone signal from another device that performs the enhancement (e.g., client device 110).

Method 800 continues at block 804, where an enhanced second microphone signal is received. The enhanced second microphone signal can result from enhancing a second microphone signal captured by a second device (e.g., client device 120) using a second personalized enhancement model that has been adapted for a second user of the second device (e.g., a personalized neural network as described above). In some cases, block 802 can involve enhancing the second microphone signal on a device performing method 800 (e.g., server 140), and in other cases block 802 can involve receiving the enhanced second microphone signal from another device that performs the enhancement (e.g., client device 120).

Method 800 continues at block 806, where the enhanced first microphone signal is mixed with the enhanced second microphone signal to obtain a playback signal. In some cases, a third microphone signal from a third device is used to obtain another playback signal that does not include the enhanced first microphone signal and the enhanced second microphone signal.

Method 800 continues at block 808, where the playback signal is sent to a third device (e.g., client device 130) that is participating in a call with the first device and the second device. In some cases, the another playback is sent to the first device and/or the second device.

Example Proximity-Based Mixing Method

Figure 9:
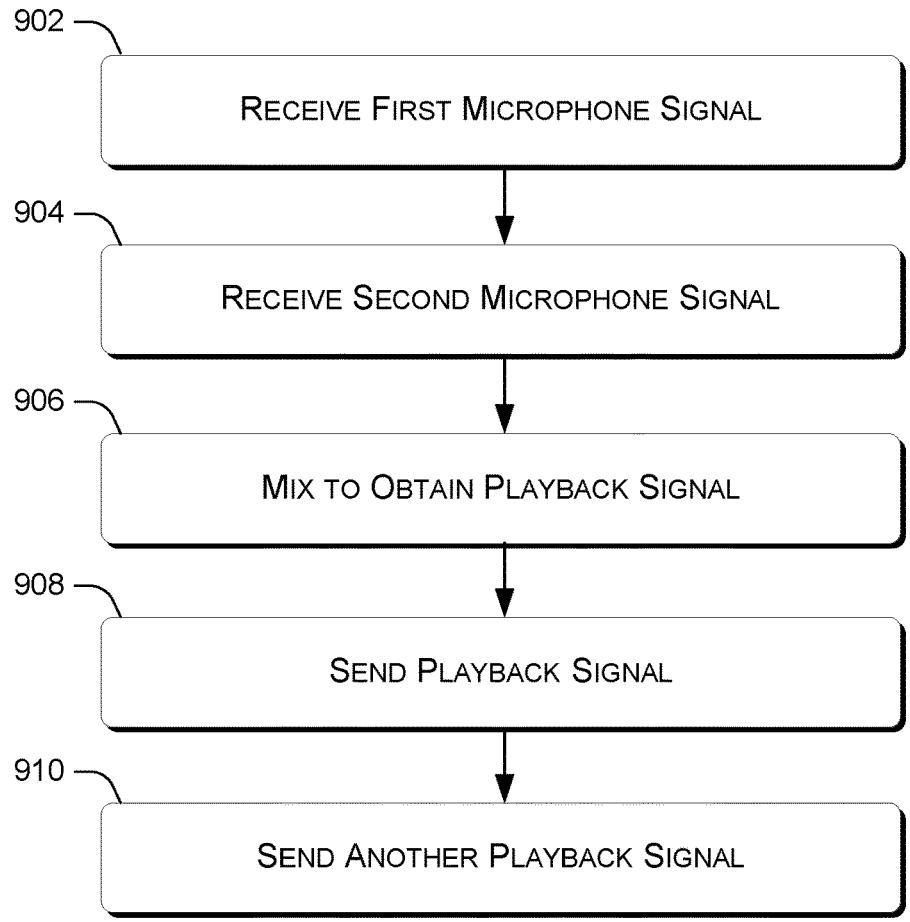
FIG. 9 illustrates an example method or technique for proximity-based mixing of teleconferencing audio, consistent with some implementations of the disclosed techniques.

FIG. 9 illustrates an example method 900, consistent with some implementations of the present concepts. Method 900 can be implemented on many different types of devices, e.g., by one or more cloud servers, by a client device such as a laptop, tablet, or smartphone, or by combinations of one or more servers, client devices, etc.

Method 900 begins at block 902, where a first microphone signal is received from a first device (e.g., client device 110). In some cases, the first microphone signal is an enhanced signal that has been enhanced by the first device using a first personalized enhancement model for a first user of the first device. In other cases, the first microphone signal can be enhanced by a device (e.g., server 140) that performs block 902 using a personalized or generic enhancement model, or can remain unenhanced.

Method 900 continues at block 904, where a second microphone signal is received from a second device (e.g., client device 120). In some cases, the second microphone signal is an enhanced signal that has been enhanced by the second device using a second personalized enhancement model for a second user of the second device. In other cases, the second microphone signal can be enhanced by a device (e.g., server 140) that performs block 902 using a personalized or generic enhancement model, or can remain unenhanced.

Method 900 continues at block 906, where the first microphone signal is mixed with the second microphone signal to obtain a playback signal. In some cases, the playback signal also includes video of individual call participants, e.g., as captured by cameras of individual devices participating in the call.

Method 900 continues at block 908, where the playback signal is sent to a third device (e.g., client device 130) that is participating in a call with the first device and the second device. Thus, a user of the third device located remotely from the first device and second device can hear speech by respective users of the first and second devices.

Method 900 continues at block 910, where another playback signal is sent to at least one of the first device or the second device. The another playback signal can omit the first microphone signal and the second microphone signal. Thus, for instance, users of the first and second devices can hear each other's actual voices without replay by their devices.

Enrollment User Experience

Figure 10:
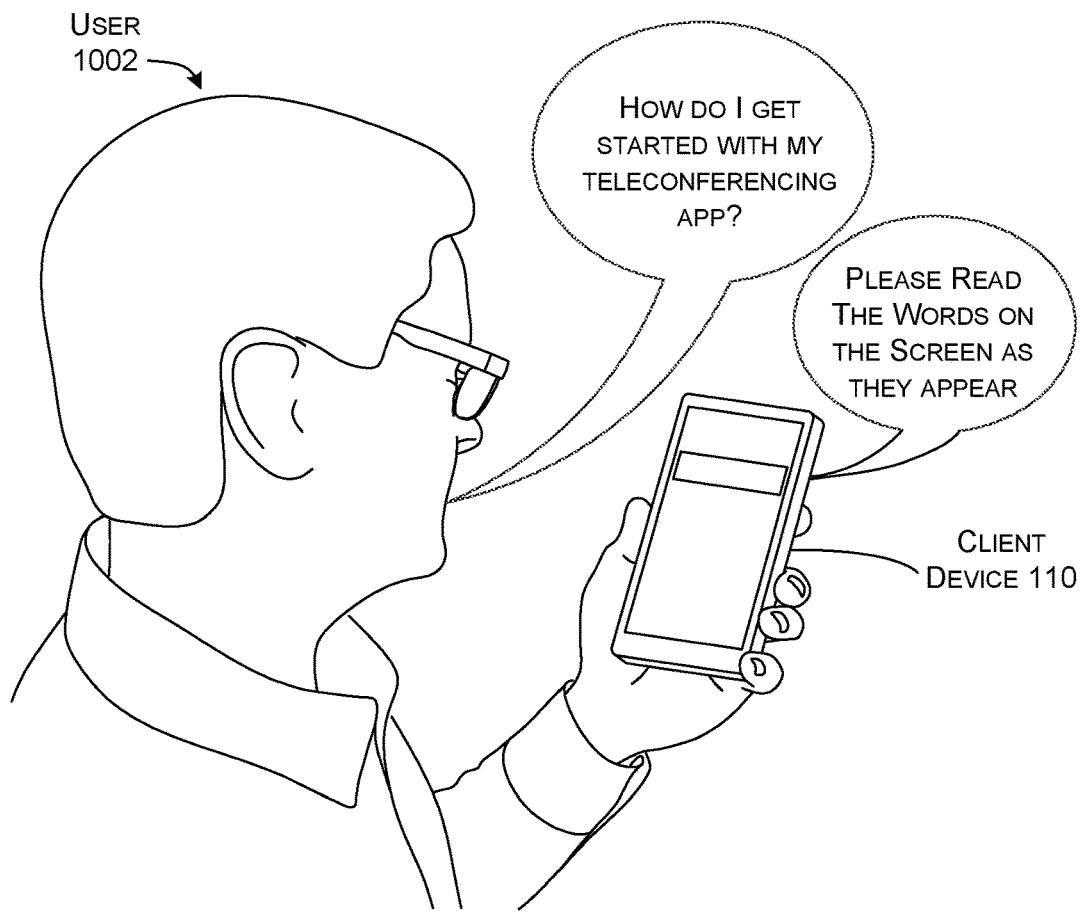
FIG. 10 illustrates an example user experience for enrollment processing to obtain a personalized enhancement model, consistent with some implementations of the present concepts.

FIG. 10 shows an enrollment scenario 1000. A user 1002 can interact with client device 110. For instance, a local teleconferencing client application can instruct the user to read words shown on the screen in a normal voice. The user's speech can be used as a speech example by the client device or by server 140 to determine a vector embedding representing acoustic characteristics of that user's speech. The embedding can be employed to personalize an enhancement model for that specific user as described previously.

In some cases, the embedding is not necessarily static, e.g., the embedding for a given user can be updated over time as that user participates in various calls. For instance, when a user employs a headset, this may provide a relatively clean speech signal that can be used to modify the embedding. In other cases, users may not perform any explicit enrollment at all. Instead, an embedding can be determined for each user in an online manner, as the user participates in a call. For instance, in some cases, the dominant speaker on a given device can be detected automatically and the dominant speaker can automatically be enrolled for personalized enhancement on that device.

Teleconferencing User Experience

Figure 11:
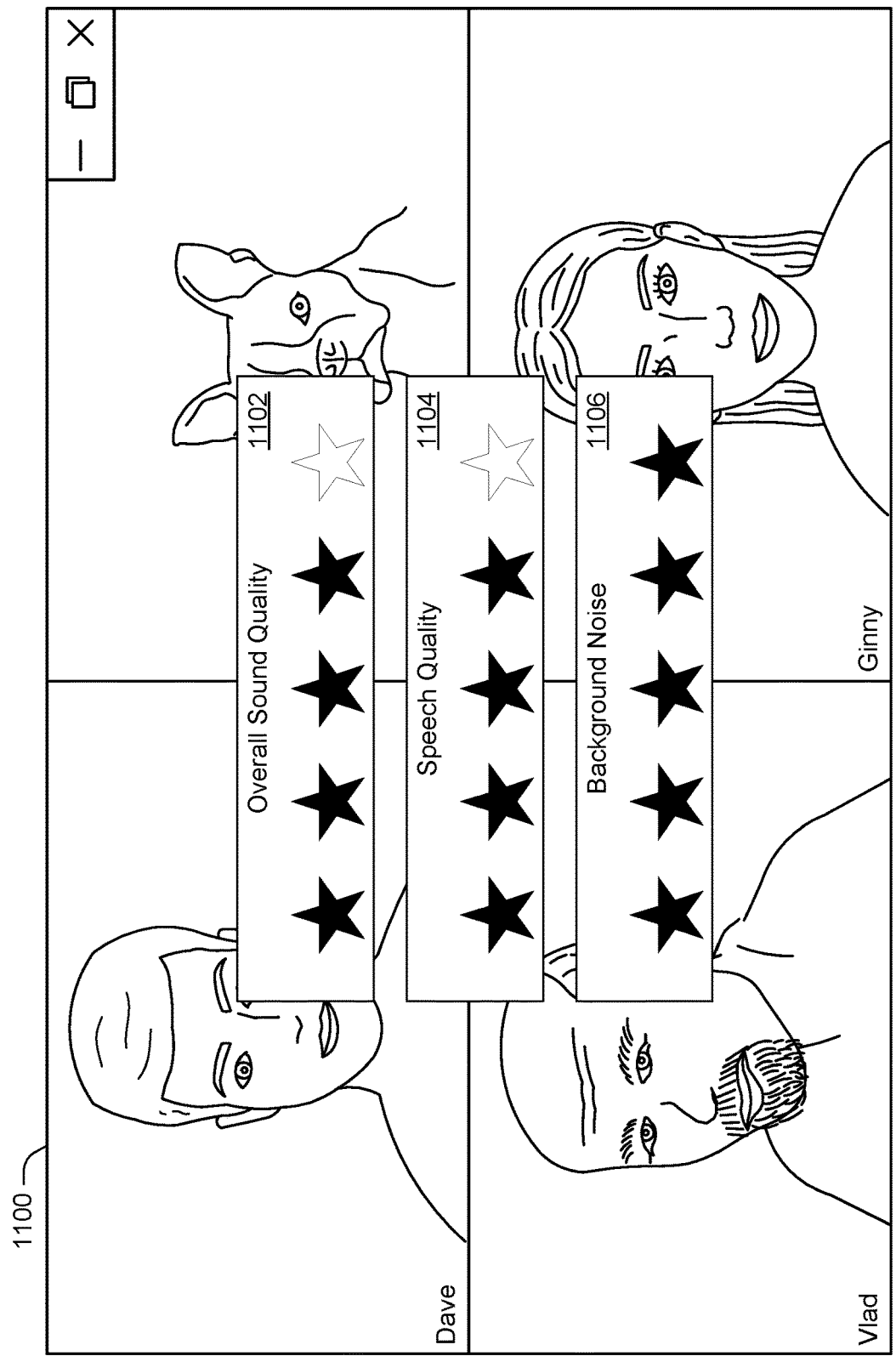
FIG. 11 illustrates an example user interface that conveys audio quality and can be used to gather training data or model selection, consistent with some implementations of the present concepts.

After enrolling in personalized enhancement and participating in a given call, a user may be provided with a video call GUI 1100 such as that shown in FIG. 11. Video call GUI 1100 includes an overall sound quality estimate 1102 that conveys a value of four stars out of five for the audio signal of a video call, a speech quality estimate 1104 that conveys a value of two stars for the speech quality of the audio signal, and a background noise quality estimate 1106 that conveys a value of five stars for the background noise of the audio signal. In some cases, the estimates are provided by automated quality estimation models, as described previously.

In some cases, video call GUI 1100 can include an option for the user to confirm or modify the audio or video quality ratings for each individual audio or video characteristic. The user input can be used to manually label audio or video content of the call for subsequent training and/or tuning of quality estimation models for overall quality and/or for specific signal characteristics, as described above. The user input and/or automated ratings can also be used to designate certain calls for use as training data for further development of enhancement models as described previously. In addition, user input can also be employed to select different teleconferencing parameters, such as jitter buffer sizes or choosing between different candidate enhancement models.

Technical Effect

As noted previously, prior techniques for distributed teleconferencing tended to provide poor call quality in certain circumstances. For instance, users in the same room generally could not use separate devices to participate in a given teleconference because of echoes and howling artifacts. While alternatives such as hardwiring co-located devices together can allow for very tight synchronization and improved call quality, these approaches are inconvenient for most use cases.

In contrast to prior approaches, the disclosed techniques allow for ad-hoc teleconferencing sessions where co-located users can employ their own devices and still achieve high audio quality without burdensome steps such as physically connecting their devices. By performing personalized enhancement of microphone signals provided by each co-located device, other nearby sound sources are attenuated sufficiently to greatly enhance call quality. For instance, a given speaker's microphone might pick up other human voices, background noise (e.g., an HVAC fan, barking dog, etc.), room reverberation, hardware artifacts, digital sounds played back by other co-located devices (incoming calls, text notifications), etc. These other sound sources can be suppressed so that the enhanced microphone signal for a given user effectively isolates their speaking voice from the other sound sources.

In addition, the disclosed techniques can employ proximity-based mixing that can adjust how microphone signals are mixed into playback signals depending on whether devices are co-located. For instance, microphone signals received from devices in a particular room can be omitted from playback signals transmitted to other devices in the same room. If a particular user leaves the room and their device is no longer co-located with the other devices in the room, then the mixing can be adjusted so that the playback signal sent to that user's device incorporates microphone signals from the other devices remaining in the room. As a consequence, users can seamlessly transition in and out of a given room while maintaining a high-quality audio experience.

In addition, note that the specific examples of personalized enhancement models described herein are computationally efficient. For instance, with respect to the specific enhancement model shown in FIGS. 6 and 7, the model is causal. In other words, the model can process only the current and past frames instead of maintaining a long history of previous frames. As a consequence, the modest memory and CPU burden of such a model allows the model to run in real-time on a given client device during a call.

Device Implementations

As noted above with respect to FIG. 1, system 100 includes several devices, including a client device 110, a client device 120, a client device 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.), microphones, etc. Devices can also have various output mechanisms such as printers, monitors, speakers, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Various examples are described above. Additional examples are described below. One example includes a method comprising receiving an enhanced first microphone signal, the enhanced first microphone signal having been produced by enhancing a first microphone signal captured by a first device using a first personalized enhancement model that has been adapted for a first user of the first device, receiving an enhanced second microphone signal, the enhanced second microphone signal having been produced by enhancing a second microphone signal captured by a second device using a second personalized enhancement model that has been adapted for a second user of the second device, mixing the enhanced first microphone signal with the enhanced second microphone signal to obtain a playback signal and sending the playback signal to a third device that is participating in a call with the first device and the second device.

Another example can include any of the above and/or below examples where the method further comprises adapting an enhancement model to the first user to obtain the first personalized enhancement model, and adapting the enhancement model to the second user to obtain the second personalized enhancement model.

Another example can include any of the above and/or below examples where the method further comprises obtaining a first speech example from the first user and a second speech example from the second user, adapting the enhancement model using the first speech example to obtain the first personalized enhancement model, and adapting the enhancement model using the second speech example to obtain the second personalized enhancement model.

Another example can include any of the above and/or below examples where the enhancement model comprises a neural network that is adapted to the first user to obtain the first personalized enhancement model and adapted to the second user to obtain the second personalized enhancement model.

Another example can include any of the above and/or below examples where adapting the enhancement model to the first user comprises determining a first embedding based at least on the first speech example and inputting the first embedding into the neural network to obtain a first personalized neural network, and adapting the enhancement model to the second user comprises determining a second embedding based at least on the second speech example and inputting the second embedding into the neural network to obtain a second personalized neural network.

Another example can include any of the above and/or below examples where the method further comprises enhancing the first microphone signal by applying first masks produced by the first personalized neural network to a frequency-domain representation of the first microphone signal, and enhancing the second microphone signal by applying second masks produced by the second personalized neural network to a frequency-domain representation of the second microphone signal.

Another example can include any of the above and/or below examples where at least the mixing is performed by a server that is remote from the first device and the second device.

Another example can include any of the above and/or below examples where the enhanced first microphone signal is enhanced locally on the first device and the enhanced second microphone signal is enhanced locally on the second device.

Another example can include any of the above and/or below examples where the method further comprises sending another playback signal to at least one of the first device or the second device, the another playback signal omitting the enhanced first microphone signal and the enhanced second microphone signal.

Another example can include any of the above and/or below examples where the method further comprises detecting that the first device and the second device are co-located, and omitting the enhanced first microphone signal and the enhanced second microphone signal from the another playback signal responsive to detecting that the first device and the second device are co-located.

Another example includes a method comprising receiving a first microphone signal from a first device, receiving a second microphone signal from a second device that is co-located with the first device, mixing the first microphone signal with the second microphone signal to obtain a playback signal, sending the playback signal to a third device that is participating in a call with the first device and the second device, and sending another playback signal to at least one of the first device or the second device, the another playback signal omitting the first microphone signal and the second microphone signal.

Another example can include any of the above and/or below examples where the method further comprises detecting that the first device is co-located with the second device, and omitting the first microphone signal and the second microphone signal from the another playback signal responsive to determining that the first device is co-located with the second device.

Another example can include any of the above and/or below examples where wherein the detecting is performed using ultrasound communication between the first device and the second device to determine that both devices are in the same room.

Another example can include any of the above and/or below examples where the first microphone signal comprises an enhanced first microphone signal that been enhanced by a first personalized enhancement model that has been adapted for a first user of the first device, and the second microphone signal comprises an enhanced second microphone signal that been enhanced by a second personalized enhancement model that has been adapted for a second user of the second device.

Another example can include any of the above and/or below examples where the method further comprises synchronizing a first speaker of the first device with a second speaker of the second device, and playing the playback signal using the synchronized first speaker and second speaker.

Another example includes a system comprising a processor, and a storage medium storing instructions which, when executed by the processor, cause the system to receive an enhanced first microphone signal from a first device, the enhanced first microphone signal having been enhanced by a first personalized enhancement model that has been adapted for a first user of the first device, receive an enhanced second microphone signal from a second device that is co-located with the first device, the enhanced second microphone signal having been enhanced by a second personalized enhancement model that has been adapted for a second user of the second device, mix the enhanced first microphone signal with the enhanced second microphone signal to obtain a playback signal, and send the playback signal to a third device that is participating in a call with the first device and the second device. The system can include any of a server, the first device, the second device, and/or the third device.

Another example can include any of the above and/or below examples where the instructions, when executed by the processor, cause the system to send another playback signal to at least one of the first device or the second device, the another playback signal including a third microphone signal received from the third device and omitting the enhanced first microphone signal and the enhanced second microphone signal.

Another example can include any of the above and/or below examples where the third microphone signal has been enhanced by a third personalized enhancement model that has been adapted for a third user of the third device.

Another example can include any of the above and/or below examples where the instructions, when executed by the processor, cause the system to detect that the first device and the second device are no longer co-located, incorporate the enhanced first microphone signal into the another playback signal, and send the another playback signal to the second device for playback.

Another example can include any of the above and/or below examples where the first device and the second device are co-located in the same physical room.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
receiving a first microphone signal from a first device during a communication session, the first microphone signal being enhanced by a first personalized enhancement model that uses self-attention processing to attenuate components of the first microphone signal including first signals other than the first microphone signal during the communication session, wherein the first personalized enhancement model comprises:
a first encoder configured to process first input features using first multi-head attention to generate first intermediate representations;
a first decoder configured to generate first masking parameters from the first intermediate representations where the first masking parameters are used to selectively enhance first speech from a first user while attenuating other first audio components;
receiving a second microphone signal from a second device that is co-located with the first device during the communication session, the second microphone signal being enhanced by a second personalized enhancement model that uses self-attention processing to attenuate components of the second microphone signal including second signals other than the second microphone signal during the communication session, wherein the second personalized enhancement model comprises:
a second encoder configured to process second input features using second multi-head attention to generate second intermediate representations;
a second decoder configured to generate second masking parameters from the second intermediate representations where the second masking parameters are used to selectively enhance second speech from a second user while attenuating other second audio components;
mixing the first microphone signal with the second microphone signal to obtain a playback signal;
sending the playback signal to a third device that is participating in a call with the first device and the second device; and
sending another playback signal to at least one of the first device or the second device, the another playback signal omitting the first microphone signal and the second microphone signal.

2. The method of claim 1, further comprising:
detecting that the first device is co-located with the second device; and
omitting the first microphone signal and the second microphone signal from the another playback signal responsive to determining that the first device is co-located with the second device.

3. The method of claim 2, wherein the detecting is performed using ultrasound communication between the first device and the second device to determine that both devices are in a same room.

4. The method of claim 1, further comprising:
synchronizing a first speaker of the first device with a second speaker of the second device; and
playing the playback signal using the synchronized first speaker and second speaker.

5. A computing device comprising:
a processor; and
a storage medium storing instructions which, when executed by the processor, cause the computing device to:
receive a first microphone signal from a first device during a communication session, the first microphone signal being enhanced by a first personalized enhancement model that uses self-attention processing to attenuate components of the first microphone signal including first signals other than the first microphone signal during the communication session, wherein the first personalized enhancement model comprises:
a first encoder configured to process first input features using first multi-head attention to generate first intermediate representations;
a first decoder configured to generate first masking parameters from the first intermediate representations where the first masking parameters are used to selectively enhance first speech from a first user while attenuating other first audio components;
receive a second microphone signal from a second device that is co-located with the first device during the communication session, the second microphone signal being enhanced by a second personalized enhancement model that uses self-attention processing to attenuate components of the second microphone signal including second signals other than the second microphone signal during the communication session, wherein the second personalized enhancement model comprises:
a second encoder configured to process second input features using second multi-head attention to generate second intermediate representations;
a second decoder configured to generate second masking parameters from the second intermediate representations where the second masking parameters are used to selectively enhance second speech from a second user while attenuating other second audio components;
mix the first microphone signal with the second microphone signal to obtain a playback signal;
send the playback signal to a third device that is participating in a call with the first device and the second device; and
send another playback signal to at least one of the first device or the second device, the another playback signal omitting the first microphone signal and the second microphone signal.

6. The computing device of claim 5, wherein the instructions, when executed by the processor, cause the computing device to:
detect that the first device is co-located with the second device; and
omit the first microphone signal and the second microphone signal from the another playback signal responsive to determining that the first device is co-located with the second device.

7. The computing device of claim 6, wherein the detecting is performed using ultrasound communication between the first device and the second device to determine that both devices are in a same room.

8. The computing device of claim 5, wherein the instructions, when executed by the processor, cause the computing device to:
synchronize a first speaker of the first device with a second speaker of the second device; and
play the playback signal using the synchronized first speaker and second speaker.

9. A system comprising:
means for receiving a first microphone signal from a first device during a communication session, the first microphone signal being enhanced by a first personalized enhancement model that uses self-attention processing to attenuate components of the first microphone signal including first signals other than the first microphone signal during the communication session, wherein the first personalized enhancement model comprises:
  a first encoder configured to process first input features using first multi-head attention to generate first intermediate representations;
  a first decoder configured to generate first masking parameters from the first intermediate representations where the first masking parameters are used to selectively enhance first speech from a first user while attenuating other first audio components;
means for receiving a second microphone signal from a second device that is co-located with the first device during the communication session, the second microphone signal being enhanced by a second personalized enhancement model that uses self-attention processing to attenuate components of the second microphone signal including second signals other than the second microphone signal during the communication session, wherein the second personalized enhancement model comprises:
  a second encoder configured to process second input features using second multi-head attention to generate second intermediate representations;
  a second decoder configured to generate second masking parameters from the second intermediate representations where the second masking parameters are used to selectively enhance second speech from a second user while attenuating other second audio components;
means for mixing the first microphone signal with the second microphone signal to obtain a playback signal;
means for sending the playback signal to a third device that is participating in a call with the first device and the second device; and
means for sending another playback signal to at least one of the first device or the second device, the another playback signal omitting the first microphone signal and the second microphone signal.

10. The system of claim 9, the system further comprising:
means for detecting that the first device is co-located with the second device; and
means for omitting the first microphone signal and the second microphone signal from the another playback signal responsive to determining that the first device is co-located with the second device.

11. The system of claim 10, wherein the detecting is performed using ultrasound communication between the first device and the second device to determine that both devices are in a same room.

12. The system of claim 9, the system further comprising:
means for synchronizing a first speaker of the first device with a second speaker of the second device; and
means for playing the playback signal using the synchronized first speaker and second speaker.

* * * * *